Oct. 16, 1923.

H. E. S. HOLT 1,470,610

PARACHUTE APPARATUS

Filed Feb. 9, 1921

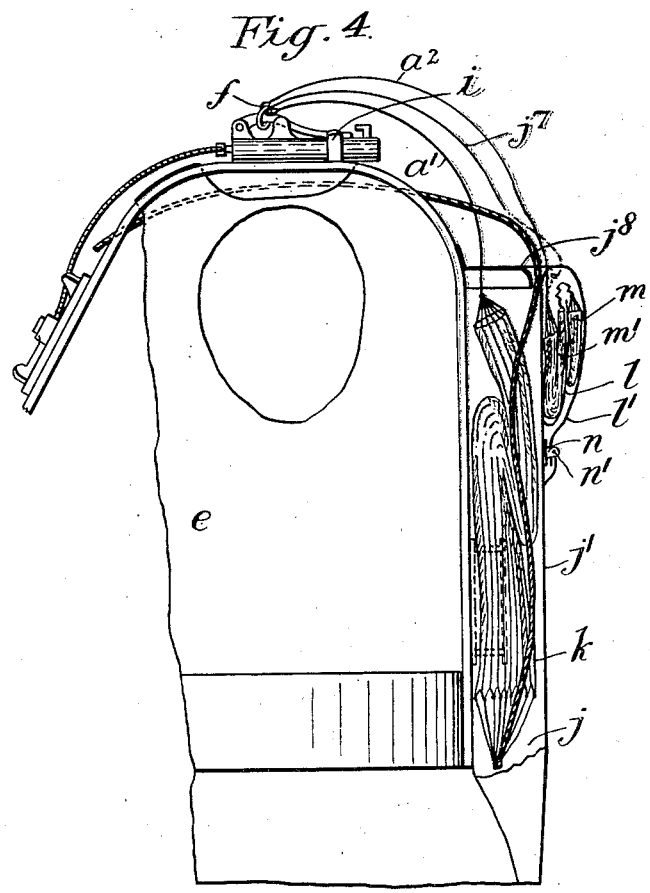
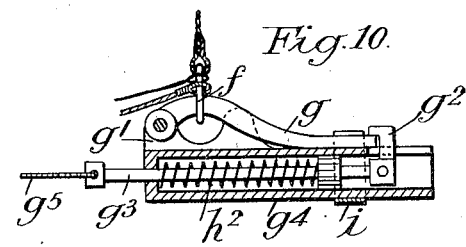

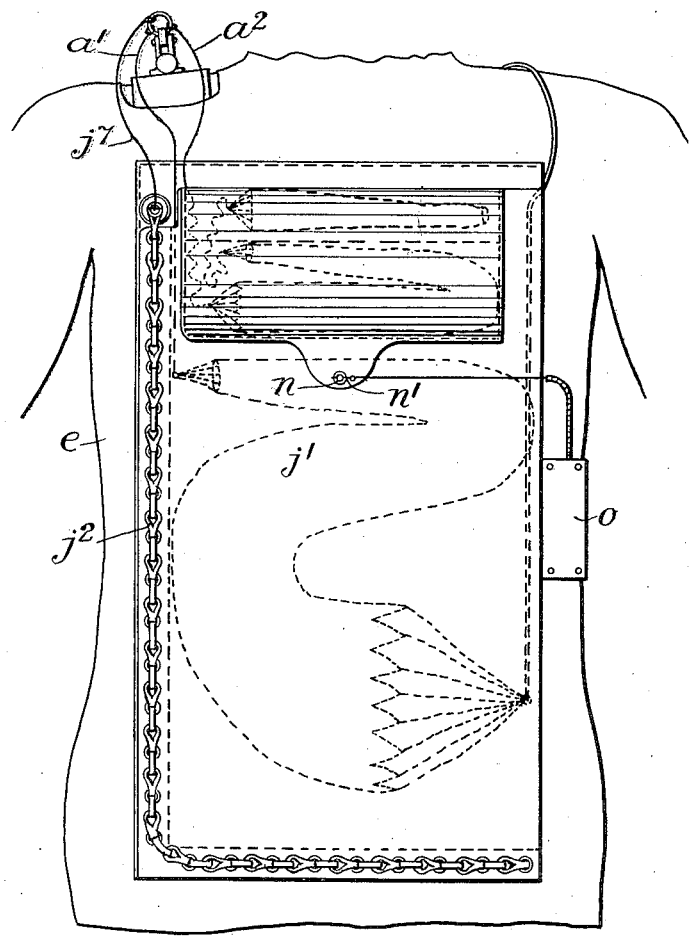

Patented Oct. 16, 1923.

1,470,610

UNITED STATES PATENT OFFICE.

HAROLD EDWARD SHERWIN HOLT, OF FARNBOROUGH, ENGLAND.

PARACHUTE APPARATUS.

Application filed February 9, 1921. Serial No. 443,586.

(GRANTED UNDER THE PROVISIONS OF THE ACT OF MARCH 3, 1921, 41 STAT. L., 1313.)

*To all whom it may concern:*

Be it known that I, HAROLD EDWARD SHERWIN HOLT, a subject of the King of Great Britain, of the Grange, Farnborough, Hampshire, England, have invented certain new and useful Improvements in Parachute Apparatus (for which I have filed application for patent in Great Britain, #703, dated January 8, 1920), of which the following is a specification.

This invention relates to parachute apparatus for enabling persons to descend with safety from aircraft and is an improvement in or modification of the invention described in the complete specification accompanying my application for Patent 16,855 of 1918 wherein pilot and main parachutes are packed in a launching case capable of being attached to the person to be lowered and the withdrawal of the main parachute from its case is affected by the pull of the pilot parachute at any desired interval after the launching of the parachute apparatus by means under manual or automatic control.

The present improvements are directed to the provision of means whereby the parachutes can be carried on the person with greater convenience and comfort than heretofore, the provision of increased facilities for their release together with more reliable control thereof, and generally to the perfecting and practical application of various devices for ensuring safety and reducing the risk attendant upon aerial navigation, by making possible a safe descent to earth in the event of accident to the aircraft.

My present improvements comprise a novel arrangement and construction of pockets or cases for receiving the main parachute and one or more pilot parachutes provided on a garment intended to be worn by the aeronaut either over or combined with a suitable harness to which the parachute cords are attached, the pockets or cases being constituted in part by flaps equipped with fastening means capable of being quickly released. My invention further comprises a timing device provided on the garment for controlling the release of the pilot or main parachute also holding and releasing devices as hereinafter described all intended to ensure effective control over the release of the parachute.

In the accompanying drawings Fig. 1 is a front view showing an aviator wearing the harness and its adjuncts before the outer garment is put on.

Fig. 4 is a sectional side elevation on a larger scale showing conventionally the parachutes in their pockets, and the connections with the harness.

Fig. 5 is a back view on a similar scale to Fig. 4.

Fig. 10 is a detail view of a release mechanism carried in a shoulder strap of the harness and capable of being manually controlled.

Figure 1:
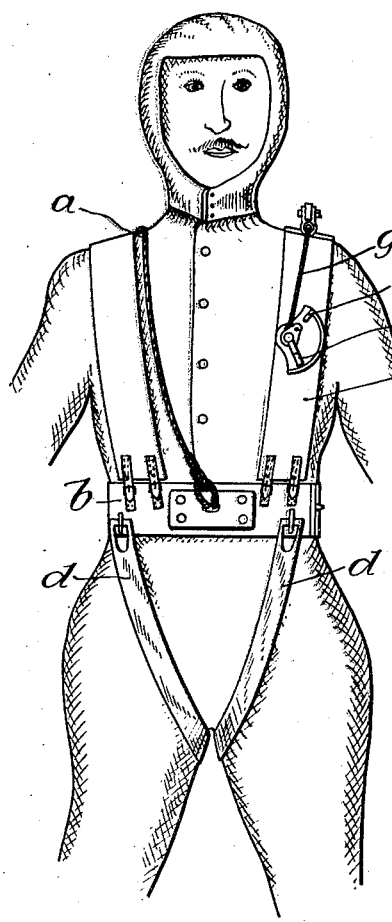
Figure 2:
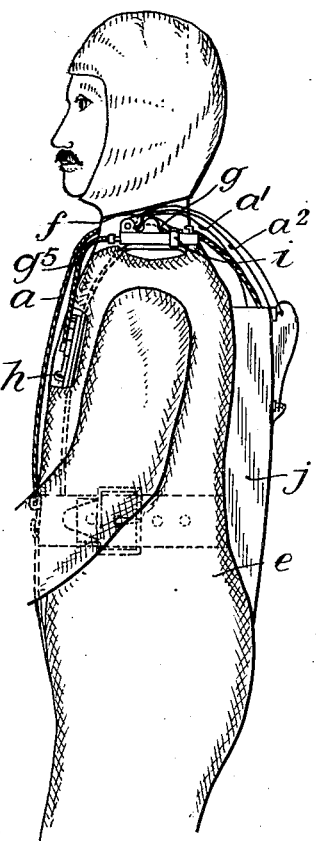
Fig. 2 is a side view showing in position the outer garment equipped with the parachute pockets or cases.
Figure 16:
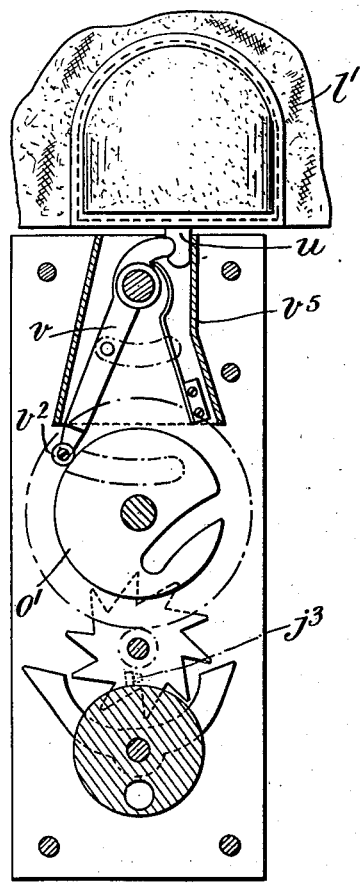
Figure 17:
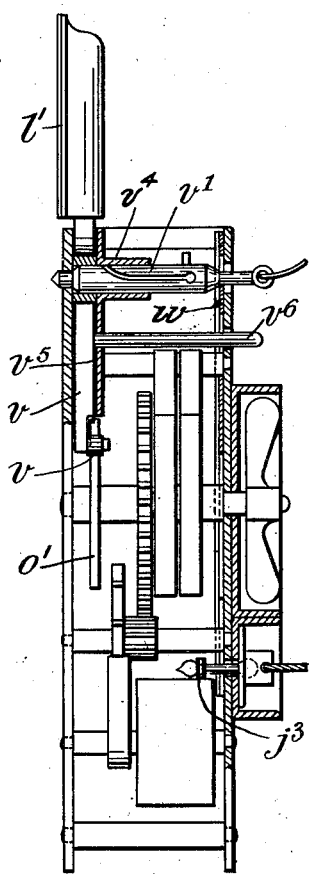

Figs. 16 and 17 are sectional elevations at right angles illustrating a slightly modified arrangement of the timing mechanism equipped with a cut out emergency plug. As shown in Figs. 1 and 2 the lead suspending cord $a$ of the main parachute is connected with a waist belt $b$ forming part of a suitable harness also including shoulder straps $c$ and in certain cases thigh straps $d$. A coat $e$ is worn over the harness and is either held down by straps attached to the skirt and passing round the legs or it may be combined with trouser-like extensions in which case the holding down straps and the thigh straps $d$ would not be required. The connections from the harness to the parachutes are taken through openings in the shoulders of the coat and include in addition to the cord $a$ a mechanism mounted on one of the shoulder straps of the harness and enabling the release of the main parachute to be manually controlled when desired as described in my previous specifications referred to. For this purpose the cords $a'$ and $a^2$ connecting the top of the main parachute with the pilot parachute which withdraws the main parachute from its pocket are both attached to a ring $f$ capable of being detachably secured to the harness by a pivoted coupling pin $g$ Figs. 2 and 10 mounted to turn in a lug or bracket $g'$ and held in the coupling position when desired by a manually controlled catch $g^2$ which is pulled into engagement with the free end of the coupling pin by a rod $g^3$ working in a tubular guide $g^4$, and actuated through a wire $g^5$ from a lever $h$ mounted adjacent to a fixed grip piece $h'$ on a plate fixed to the shoulder strap. A spring $h^2$ coiled on the rod $g^3$ tends to move the catch $g^2$ into the release position so that in order to prevent the release and withdrawal of the main parachute, the aviator has to maintain a grip on the lever $h$. A spring clip $i$ normally holds the coupling lever closed but permits it to fly open under the pull of the pilot parachute if the catch $g^2$ is not in engagement with the said lever.

Figure 3:
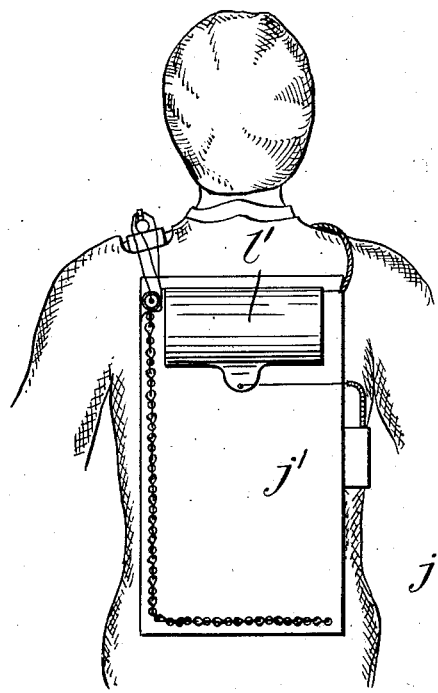
Fig. 3 is a back view.
Figures 6, 7:
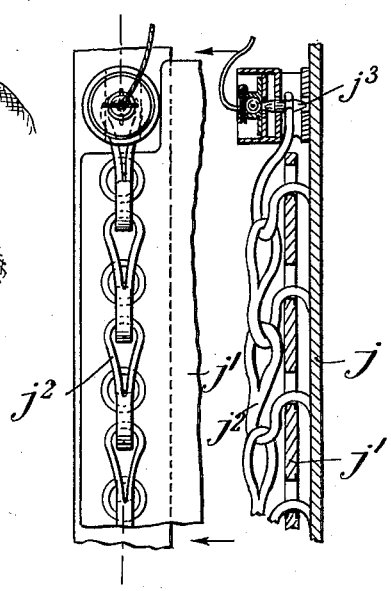
Figs. 6 and 7 are enlarged detail views of a quick release fastening applied to the flap of the pocket holding the main parachute.
Figure 8:
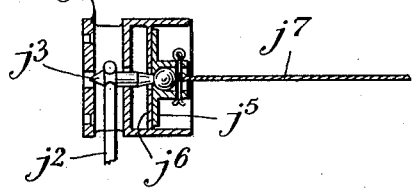
Figs. 8 and 9 are detail views illustrating in section and elevation respectively a withdrawable locking pin forming part of the fastening means.
Figure 9:
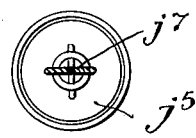

As clearly shown in Figs. 3, 4 and 5, a pocket or case $j$ for holding the main parachute $k$ is formed and forms part of the back of the coat $e$ the outer side of the pocket consisting of a flap $j'$ secured by a fastening composed of loops $j^2$ attached to the coat and passed through eyelets in the flap adjacent loops being engaged with each other in a known manner to permit of the flap being instantly pulled open when the end loop is released.

Any other form of fastening may be employed however which will permit of the flap $j'$ being quickly pulled or ripped open to allow of free egress for the main parachute.

As clearly shown in Figs. 6 to 9 the end loop of the fastening $j^2$ of the flap $j'$ is secured by a pin $j^3$ arranged to engage the end loop which is inserted in a metal fitting $j^4$ attached to the coat adjacent to the corner of the pocket. The pin $j^3$ is pulled out of the engagement either by a timing gear or by the pull of the pilot parachute, and in order that the pin may be operated by a pull in any direction, it is connected by a spherical head with a disc $j^5$ working in a cylindrical guide on the fitting $j^4$, said disc bearing against a partition $j^6$ in the guide and by tilting acting as a lever should its operating cord or the like be pulling at any angle to the axis of the pin. In the example illustrated a cord $j^7$ is arranged to transmit the pull of the pilot parachute to the pin $j^3$ for releasing same, or alternatively the timing gear could be arranged to release the fastenings of both the pilot and main parachute simultaneously by providing two Bowden wires leading to the two fastening thereby making the opening of the main parachute independent of the pilot parachute. In such case a flat spiral or other spring could be arranged in the pocket to eject the main parachute in a known manner. At the top the pocket $j$ is closed by a cover flap $j^8$ which is loosely folded in and offers no obstruction to the opening of the flap $j'$. On the outer face of the main parachute pocket that is to say on the flap $j'$ a pocket $l$ is formed for receiving a pilot parachute or parachutes the ends of this pocket being folded inwards as indicated in dotted lines Fig. 5. As shown there are two pilot parachutes, one indicated at $m$ made of thin silk and as light as possible so as to readily open and another $m'$ made of stronger or heavier fabric and of larger dimensions than the first with a view to retarding the descent of the load to some extent until such time as the main parachute is pulled out and opens and also preventing too great a shock on the main parachute as it takes the pull of the load.

A closing flap $l'$ is arranged to fold over the pocket $l$ for the pilot parachutes and forms a continuation of the back of the pocket being sewn to the coat below the level of the mouth of the pocket so that in springing open the inner part of the flap tends to move towards the front of the pocket and assists in ejecting the pilot parachute, the flap is made of either flexible or rigid material and has flat springs or elastic bands $l^2$ arranged to draw it back as soon as it is released. In order to ensure its instant and unimpeded release upon the opening of the flap the first pilot parachute $m$ is preferably packed between the front of the pocket and the flap.

Figure 11:
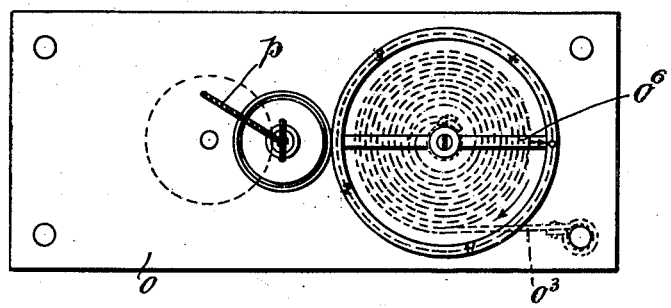
Fig. 11 is an elevation of a delay mechanism for controlling the release of a pilot parachute.
Figure 12:
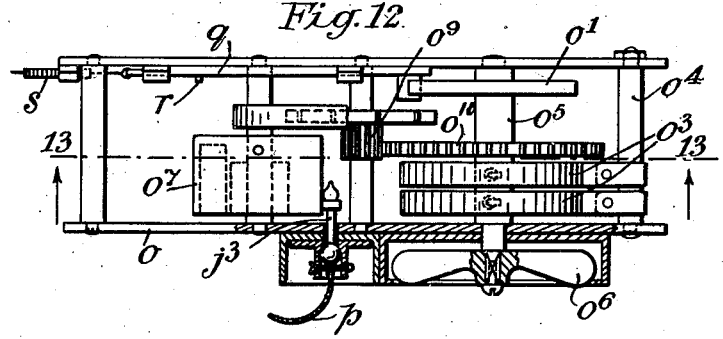
Fig. 12 is a plan of the same partly in section.
Figure 13:
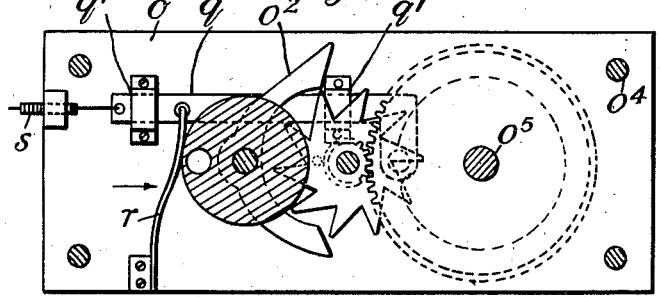
Fig. 13 is a section taken along the line 13—13 Fig. 12.

As illustrated in Figs. 3 to 5 the flap $l'$ is fastened to an apertured lug $n$ by a withdrawable pin $n'$ connected by a Bowden wire mechanism with a timing device $o$ shown on a larger scale in Figs. 11 to 13 capable of being set to release the pilot parachute after any predetermined interval. A description of the timing mechanism which embodies novel features of construction intended to ensure accuracy and reliability may be given here. The said mechanism comprises a suitable frame within which is mounted a spring-driven timing disc $o'$ a double acting balanced escapement $o^2$ geared with and controlling the rate of unwinding of the spring, and a member operatively connected with the flap fastening and held against the periphery of the timing disc over which it can be caused to travel through an arc of variable length before entering a notch therein to effect the release of the fastening. As shown there are two driving springs $o^3$ each connected at one end with a fixed spindle $o^4$ and at the other end with a winding spindle $o^5$, having a winding head $o^6$. The timing disc $o^7$ is mounted on and rotates with the winding spindle in both directions, owing to the double acting escapement $o^2$ permitting of rotation in either direction as will be readily understood. The escapement may be balanced either by a weight $o^7$ as shown or by a spring, and its wheel is geared to the spindle $o^5$ by a pinion $o^9$ and toothed wheel $o^{10}$. For setting the timing mechanism the head $o^6$ of the winding spindle moves over a suitable index outside the casing. After being set the spindle is held against rotation by locking the escapement with the aid of a pin $j^3$ of the kind previously described engaging a projection on the escapement weight and attached by a breaking cord $p$ to some part of the aircraft so that the pin is withdrawn automatically when the aviator leaves the aircraft allowing the timing mechanism to come into action, alternatively a weight may be employed to pull out the pin $j^3$. The timing mechanism works freely and needs no lubrication.

As shown in Figs. 12 and 13 a bar $q$ is mounted to slide in guides $q'$ on one of the frame plates of the timing device being forced in one direction by a spring $r$. One end of the bar is connected by a Bowden wire mechanism $s$ with the pin $n'$ for releasing the flap $l'$, whilst its other end has a projection that is caused by the action of the spring $r$ to bear against the periphery of the timing disc.

Figure 14:
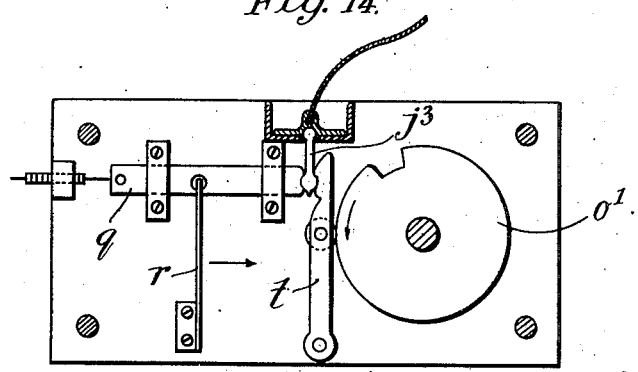
Fig. 14 is a sectional elevation of an emergency release mechanism.

The release takes place when the projection on the bar $q$ comes opposite a notch formed in the periphery of the timing disc, allowing the bar to slide a sufficient distance to operate the Bowden wire mechanism. S Fig. 14 illustrates an arrangement for cutting out the timing gear. In this case the bar $q$ instead of bearing directly against the periphery of the timing disc $o'$ is operatively connected with the disc through a withdrawable pin $j^3$ of the kind previously described and a lever $t$ having a small roller running on the disc. By withdrawing the pin $j^3$ the bar can operate to release the flap irrespective of the position of the timing disc.

Figure 15:
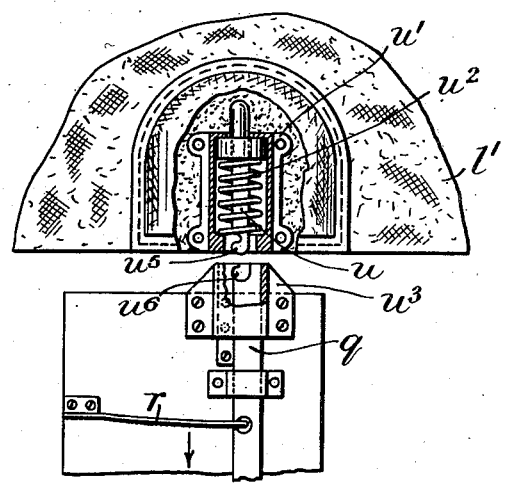
Fig. 15 illustrates an alternative form of fastening for the flap of the pilot parachute pocket.

Fig. 15 illustrates an arrangement in which the bar $q$ of the timing device is brought into direct engagement with a fastening catch $u$ on the flap $l'$. The catch $u$ is mounted in a guide sleeve $u'$ and retracted by a spring $u^2$ but can be pressed by hand into a socket $u^3$ on the framing of the timing device, the bolt and socket having corresponding hook portions $u^5$, $u^6$, which are adapted to be held in engagement by the end of the bar $q$ recessed as shown to receive the end of the hook. When however, the bar $q$ slides away from the catch owing to the operation of the timing disc as described the catch is retracted by its spring and releases the flap.

In the modified form of construction illustrated in Figs. 16 and 17, a notched timing disc $o'$ co-operates with a lever $v$ pivoted on a withdrawable plug $v'$ and adapted to be held in engagement with the catch $u$ on the flap $l'$ by the timing disc. The lever $v$ carries a small roller $v^2$ which runs on the periphery of the disc and enters a curved notch $v^3$ in the disc to enable the lever to turn on its pivot under the action of a spring $w$ and thus release the fastening catch $u$ of the flap $l'$. By withdrawing or partly withdrawing the plug $v'$ by pulling on a cord attached to it, the catch can be released in an emergency independently of the timing gear. If it is not desired to entirely withdraw the plug $v'$ the end portion of the plug is reduced in diameter to such an extent that partial withdrawal of the same leaves sufficient play in the pivot eye of the lever to allow of the release of the catch. As shown the plug is guided in a sleeve or bars $v^4$ formed on side of a guide casing $v^5$ enclosing the lever and may be split longitudinally to prevent play. A setting handle $v^6$ on the lever $v$ projects through a slot in front of the timing device.

In order to prevent the premature withdrawal of the emergency plug $v'$ it is preferably locked in position by a plate $w$ mounted to slide in guides in the timing device and held in engagement with a tapering shoulder on the plug by the locking pin $j^3$ of the escapement mechanism which engages an aperture in the plate $w$ as shown in Fig. 17. This arrangement ensures that the plug cannot be withdrawn to release the pilot parachute until the parachute apparatus has fallen clear of the aircraft.

I claim:—

1. A garment having a receptacle, a main parachute in said receptacle, a cover for said receptacle, said cover also having a receptacle, a pilot parachute in the receptacle of the cover, a cord connecting the parachutes together, means to secure and release said cord, a cover for the pilot parachute receptacle, fastening means for the cover of the first named receptacle, means to release said fastening means, fastening means for the cover of the pilot parachute receptacle, and means to release the last named fastening means.

2. A garment having a receptacle, a main parachute in said receptacle, a cover for said receptacle, said cover also having a receptacle, a pilot parachute in the receptacle of the cover, a cord connecting the parachutes together, means to secure and release said cord, a cover for the pilot parachute receptacle, fastening means for the cover of the first named receptacle, means operated by the pilot parachute to release said fastening means, fastening means for the cover of the pilot parachute receptacle, and means to release the last named fastening means.

3. An article to be worn by an aviator and having a receptacle, a main parachute in said receptacle, a second receptacle, a pilot parachute in the second receptacle, a cord connecting the parachutes together, means to secure and release said cord, and means to normally hold said securing and releasing means in released condition.

4. A garment having a receptacle, a main parachute in said receptacle, a cover for said receptacle, said cover also having a receptacle, a pilot parachute in the receptacle of the cover, and fastening means for said cover.

5. A garment having a receptacle, a main parachute in said receptacle, a cover for said receptacle, said cover also having a receptacle, a pilot parachute in the receptacle of the cover, fastening means for said cover, and timing gear controlled means to release said fastening means.

6. Parachute holding means arranged to be worn by an aviator and including parachute releasing means, a pin to secure said releasing means, and operating means including a timing gear, for said pin.

7. Parachute holding means arranged to be worn by an aviator and including parachute releasing means, a pin to secure said releasing means, and operating means including a timing gear, for said pin, said timing gear including a spring driven timing disk, an escapement enabling said disk to rotate in either direction, and a stop capable of being operated to release the timing gear when the parachute is launched.

8. A garment having a receptacle, a main parachute in said receptacle, a cover for said receptacle, said cover also having a receptacle, a pilot parachute in the receptacle of the cover, fastening means for said cover, timing gear controlled means to release said fastening means and means for cutting out the timing gear.

9. A garment having a receptacle, a main parachute in said receptacle, a cover for said receptacle, said cover also having a receptacle, a pilot parachute in the receptacle of the cover, fastening means for said cover, timing gear controlled means to release said fastening means, and means for cutting out the timing gear, said means including an emergency pin and an operating cord.

10. Parachute holding means arranged to be worn by an aviator and including parachute releasing means, a pin to secure said releasing means, and operating means including a timing gear, for said pin, said timing gear including a spring driven timing disk, an escapement enabling said disk to rotate in either direction, a stop capable of being operated to release the timing gear when the parachute is launched, means for cutting out the timing gear including an emergency pin and an operating cord therefor, and means for interlocking the emergency pin with the stop of the timing gear to prevent the pin from being operated until the stop has been moved to release position.

In testimony whereof he has affixed his signature.

HAROLD EDWARD SHERWIN HOLT.